United States Patent

[11] 3,593,365

[72] Inventor Paul D. Amundsen
 Wonder Lake, Ill.
[21] Appl. No. 830,060
[22] Filed June 3, 1969
[45] Patented July 20, 1971
[73] Assignee Fendall Company
 Chicago, Ill.

[54] SPECTACLE HINGE
 2 Claims, 5 Drawing Figs.
[52] U.S. Cl. .................................................. 16/169
[51] Int. Cl. .................................................. E05d 5/10
[50] Field of Search ........................................... 16/168,
 169, 128; 287/100

[56] References Cited
UNITED STATES PATENTS
3,068,508 12/1962 Heyer ........................... 16/168
3,349,430 10/1967 Rosenvold et al. ........... 16/169
3,188,686 6/1965 Orcutt ........................... 16/169

Primary Examiner—Bobby R. Gay
Assistant Examiner—Doris L. Troutman
Attorney—Hill, Sherman, Meroni, Gross & Simpson ABSTRACT: A spectacle hinge constructed of metallic components and incorporating interleaved hinge members of a relatively soft material and a hinge pin passing pivotally therebetween wherein the hinge pin is provided with means providing an interference relationship with one of the hinge members in a manner preventing inadvertent hinge disassembly following a forced insertion of the pin.

PATENTED JUL 20 1971 3,593,365

INVENTOR.
Paul D. Amundsen
BY Hill, Sherman, Meroni, Gross & Simpson
ATTORNEYS 3,593,365

1

SPECTACLE HINGE

BACKGROUND OF THE INVENTION

Spectacle frames have long been manufactured with a main frame portion having two lenses and two temples pivotally attached thereto. In prior art devices, the temples are pivotally secured to the main frame by way of hinge members. The hinge members comprise interleaved hinge plates respectively secured to the main frame and a temple, and a generally vertically disposed hinge pin passing through the interleaved portions by way of aligned apertures. Typically, such hinge assemblies incorporate a pin having a threaded portion arranged for cooperation with a threaded portion in the hinge. Unfortunately, in heavy-duty use, continued oscillation of the temple relative to the frame often causes loosening of the screw and loss of the pin. Many techniques have been proposed for overcoming such inadvertent disassembly. However, the structure of the present invention provides an improved retentivity with an absolute minimum of cost. Further, the hinge pin employed in accordance with the present invention is compatible with prior art threaded hinge barrels and may be substituted in the field for such prior art threaded hinge pins.

SUMMARY OF THE INVENTION

In accordance with the principles of the present invention, a cylindrical hinge pin is employed. The hinge pin has a basic diameter substantially the same as the aperture diameter of the spectacle hinge. In most spectacle hinges constructed in recent times, a plurality of hinge leaves are found on each hinge member and the two are interleaved so that the apertures on the individual leaves of each hinge member are in alignment. Following this alignment, a pin is passed into position in the aligned apertures. In accordance with the present invention, the hinge pin interferes, by staking at one or more points in its periphery, or otherwise, causing a radial interference radially outwardly of the pin. The pin is preferably constructed of a relatively hard and corrosion-resistant material. It is preferably chosen to have a hardness substantially in excess of the hardness of the hinge plate material. Accordingly, after the hinge members have been interleaved and the apertures thereof aligned, the pin is forced into the aperture with the protrusions cutting or otherwise displacing the metal of the hinge members as the pin moves into its final position. In the final position, each protrusion on the pin is embedded in a single hinge leaf and the springback of the leaf material causes the pin to remain embedded in a fixed nonrotational position relative to that leaf. I have found that this permanent deflection of the leaf material coupled with the slight springback of the material upon pin insertion, provides a combination in which the pin remains fixed against axial direction. The pin is not rotational in the hinge and has no apparent means of being disassembled. In the preferred embodiment, I provide it with an extension which projects through the end of the hinge barrel for cooperation with a plier, if removal is necessary. The pin may be reassembled in a satisfactory assembly by rotation of the pin somewhat away from its originally inserted position and a reinsertion with a resultant permanent deformation of the hinge leaves or barrels in an angularly removed position from the original deformations.

It is, accordingly, an object of the present invention to provide an improved spectacle hinge and hinge pin providing a substantially improved construction preventing inadvertent disassembly and providing a hinge of improved strength.

2

Figure 1:
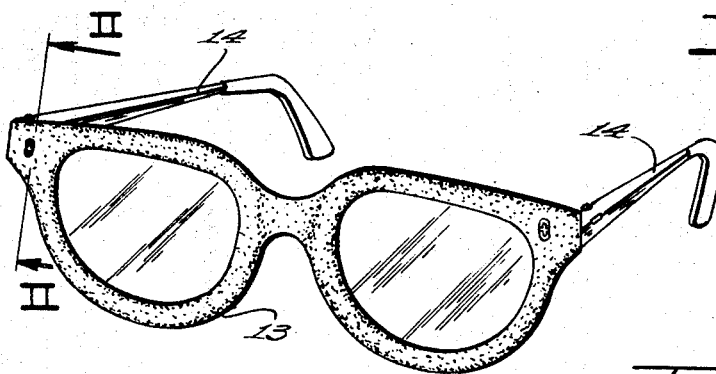
FIG. 1 is an isometric view of a spectacle assembly.
Figure 4:
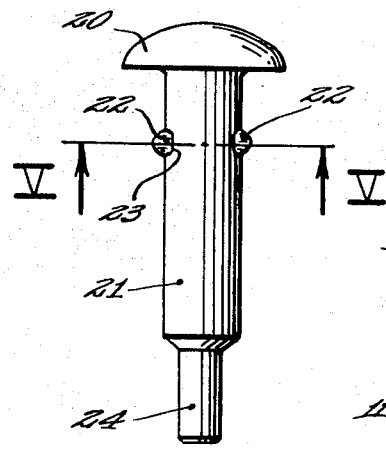
Figure 3:
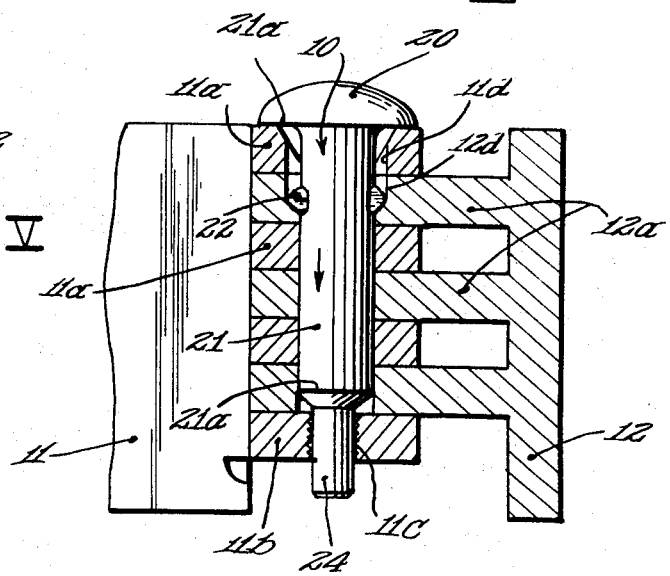
Figure 2:
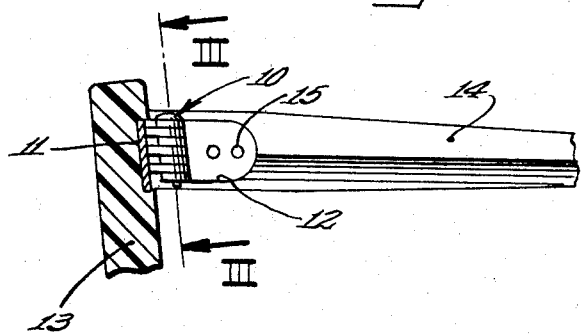
FIG. 2 is a cross-sectional view, taken along the line 11–II of FIG. 1.
Figure 5:
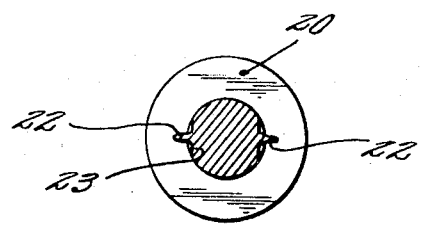

FIG. 3 is an enlarged cross-sectional view taken along the line III–III of FIG. 2;

FIG. 4 is a detailed elevational view, of the hinge pin of the present invention; and FIG. 5 is a cross-sectional view of the pin shown in FIG. 4 taken along the line V–V.

DETAILED DESCRIPTION

As can be seen from a consideration of FIGS. 1 through 5, a preferred embodiment of the present invention comprises a hinge pin generally indicated at 10 securing hinge plates 11 and 12 attached respectively to the main spectacle frame 13 and temples 14. The hinge plates 11 and 12 may be conventional, if desired, and may be secured in any conventional manner to the frame and temple respectively. In the embodiment illustrated, rivets 15 are satisfactorily employed for this purpose. When conventional hinge members 11 and 12 are employed, the lowermost hinge leaf or barrel 11b is provided with a threaded portion 11c having a standard thread. Such a thread cooperates with a standard threaded screw pin but forms no part of the combination of the present invention in which the pin is unthreaded.

The hinge pin generally illustrated at 10 comprises an enlarged head portion 20 and a shank portion 21 which is substantially cylindrical and of round cross section. Protrusions or ears 22 are deformed into the periphery of the pin by staking or cold die forming which flows the pin material from the main shank 21 into the projections 22 leaving, when such method is employed, slight depressions 23 from which the material has flowed. In effect, the ears are formed by pinching the surface of the shank 21 in the preferred embodiment. However, it will be understood that the protrusions may be provided by welding or other means, if desired.

The protrusions, or ears, 22 are constructed of a material harder than the hinge leaves or barrels 11a and 12a, so that upon axial force being applied in the direction of the arrow shown in FIG. 3, the pin cuts through the uppermost barrel 11a as shown at 11d and partially cuts into the barrel portion 12a immediately therebeneath as at 12d. The slight springback of the material of the barrel 12a causes the protrusions 22 to remain fixed in axial position. The head 21a of the pin 10 limits the movement of the pin downwardly so that the protrusions 22 are approximately midway of the barrel 12a and cooperate with only one barrel. It is important that the protrusions not cooperate with two immediately adjacent interleaved barrels or the pivotal action of the hinge would be impaired.

In the embodiment illustrated, the pin is provided with a pair of diametrically opposite protrusions 22. This provides a balanced force during the insertion of the pin and is desirable. However, it will be obvious that a single protrusion may be employed, if desired, or, alternatively, a number of protrusions may be employed axially spaced along the pin. In this latter situation, it is important that the protrusions be spaced by a width the same as or greater than the thickness of the intervening hinge leaf or barrel so that the protrusions cooperate only with one hinge member upon being assembled. With that arrangement, the pin is rigidly secured to one hinge member but is free to pivot relative to the other, providing a satisfactory hinge.

Disassembly of the pin may be accomplished by applying force to the projection 24 which may, if desired, extend beyond the lowermost end of the hinge barrel. A plier, providing a recess above the pinhead 20, may be employed for the application of this axial force. It will be understood, however, that, if desired, the extension 24 may be eliminated and disassembly of the pin provided for by cooperation with a plier having an upwardly extending small projection for cooperation with the lower end of the pin. In either case, no threads are provided for on the pin and no screwdriver slot or the like is apparent on the head 20, so that no apparent means is provided for removal of the pin and undesirable disassembly of the components is avoided. Various materials may be employed in the satisfactory manufacture of the present invention. I have found that the stainless steel of the 300 Series type is a particularly satisfactory material for the hinge pin since it is very resistant to corrosion and since it is also substantially harder than the nickel-silver material conventionally employed in the hinge plates. However, it will be apparent that substantially any material may be employed for the pins provided that it is harder than the hinge members.

In the preferred embodiment illustrated and discussed above, the pin is provided with an interference fit relation with one of the hinge members by means of self-cutting ears. An alternative construction may comprise an interference press fit between the pin and one hinge member without the ears noted above. Thus, the apertures in hinge leaves 12a may be made slightly smaller than the apertures in hinge leaves 11a and slightly smaller than the diameter of the pin shank 21. Then, when the pin is forced into apertures in a press fit, the leaves 12a stretch and spring back tightly gripping the pin. Free pivotal action is provided since the apertures in leaves 11a have a loose fit on the pivot pin. Similarly, the pin may have ears only sufficiently projecting to provide such a friction fit, without cutting into the hinge material.

It will be apparent from the above, that I have provided a novel, extremely simple, and inexpensive hinge, particularly adapted to heavy-duty safety glasses or the like. Further variations and modifications may be made in accordance with the present invention without departing from the spirit thereof and it is intended, accordingly, that the invention be limited solely by the scope of the hereinafter appended claims.

I claim:

1. In combination in a spectacle, a pair of hinge members having leaves for overlapping interengagement with each other, peripherally unbroken apertures in said leaves for alignment to form a pivot aperture, a pivot pin inserted in said aligned apertures and having at least a portion of the surface thereof in interference fit relation with the internal diameter of at least one leaf of one of said hinge members whereby said pin is retained in axially fixed position relative to said assembled pair of hinge members, said pin having at least one protrusion with an effective radius substantially greater than the radius of the internal diameter of the aperture of said one leaf for interference press fit therewith, said pin comprising a material harder than the material of said hinge members to cut therethrough to provide a permanent-locking deformation relation therewith.

2. The structure of claim 1 wherein said pin comprises Series 303 Stainless Steel.